United States Patent [19]

Yoshida et al.

[11] Patent Number: 4,743,934
[45] Date of Patent: May 10, 1988

[54] EXPOSURE CONTROL APPARATUS FOR CAMERAS

[75] Inventors: Yutaka Yoshida; Masashi Takamura, both of Tokyo, Japan

[73] Assignee: Fuji Photo Film Co., Ltd., Kanagawa, Japan

[21] Appl. No.: 1,022

[22] Filed: Jan. 6, 1987

[30] Foreign Application Priority Data

Jan. 6, 1986 [JP] Japan .................................. 61-40

[51] Int. Cl.$^4$ ............................................. G03B 7/097
[52] U.S. Cl. .................................................. 354/439
[58] Field of Search .............. 354/435, 436, 437, 439, 354/440, 230, 234.1

[56] References Cited

U.S. PATENT DOCUMENTS

| | | | |
|---|---|---|---|
| 3,873,987 | 3/1975 | Brauning et al. | 354/436 |
| 3,882,522 | 5/1975 | Erlichman | 354/437 |
| 4,005,448 | 1/1977 | Iwata et al. | 354/439 |
| 4,107,705 | 8/1978 | Hashimoto et al. | 354/440 |

Primary Examiner—W. B. Perkey
Attorney, Agent, or Firm—Young & Thompson

[57] ABSTRACT

A stepping motor drives camera shutter sectors to open and close an exposure aperture. The stepping motor is rotated at a speed corresponding to an exposure value during the time between the start position of the shutter sectors and their position when they start opening the exposure aperture. After the sectors start opening the exposure aperture, the stepping motor is rotated at a constant speed not associated with the exposure value.

12 Claims, 4 Drawing Sheets

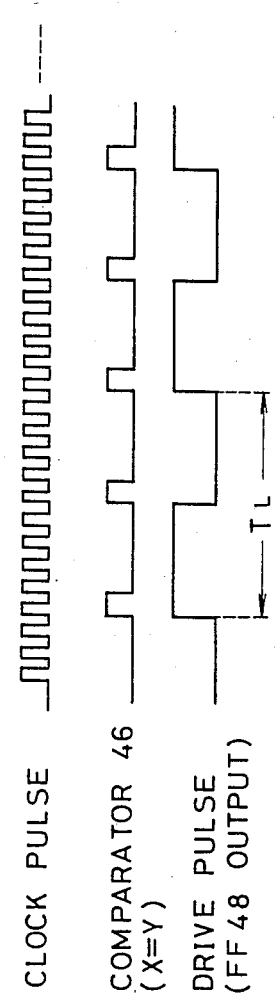
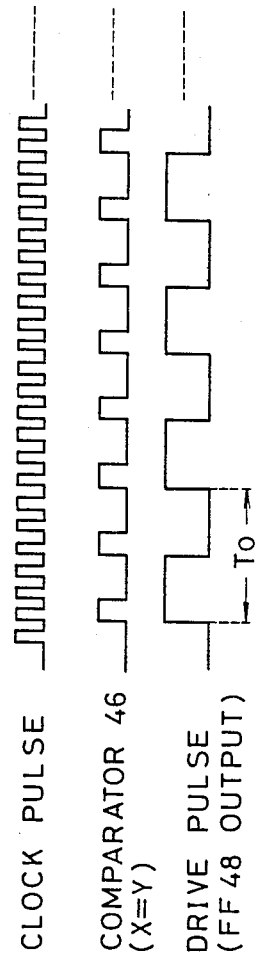

EXPOSURE CONTROL APPARATUS FOR CAMERAS

FIELD OF THE INVENTION

The present invention relates to an improved exposure control apparatus which uses a stepping motor for controlling the opening and closing of the sectors of a camera shutter.

BACKGROUND OF THE INVENTION

A program-controlled shutter for opening and closing the sectors of a camera shutter using a stepping motor has been proposed which avoids the use of a mechanical shutter charge mechanism and electrically and digitally performs exposure control.

To control the opening and closing of shutter sectors using a stepping motor, the stepping motor is first rotated in a forward direction to start opening the sectors, and then the sectors are stopped by rotating the stepping motor in a reverse direction. In such exposure control, the maximum open position of the shutter sectors is determined based on object brightness, film sensitivity and the like. If the determined maximum open position does not coincide with a unit step angle of the stepping motor, an exposure error occurs.

To eliminate such exposure error, a method as disclosed for example in Japanese Patent Laid-Open Publ. No. 60-57357 is known. In this method, the number of drive pulses is determined by an exposure value obtained through calculation, the drive pulses being used for driving the stepping motor and having a normal pulse width. In addition, an interpolating drive pulse is calculated for use in opening the shutter sectors to a proper or correct open position. Specifically, the stop position of the stepping motor during a forward rotation is determined by a plurality of drive pulses having a normal pulse width and an interpolating drive pulse having a narrower pulse width than normal.

With the above method, it is necessary to determine, prior to starting the stepping motor, the number of normal drive pulses and the pulse width of the interpolating drive pulse, which requires a complicated circuit configuration. Furthermore, the inertia of the drive transmission mechanism between the rotors or between the stepping motor and the shutter sectors, may cause a delay in the operation of the sectors. Because of this inertia, even if the stepping motor is rotated in a reverse direction at the instant the sectors reach the correct open position corresponding to the exposure value, the sectors will overrun the correct open position. Only thereafter will the sectors be moved back to the correct position. Such overrunning motion of the sectors is a serious drawback, particularly in the case of high shutter speed, and is in fact the main cause of over-exposure.

SUMMARY OF THE INVENTION

It is an object of the present invention to provide an exposure control apparatus which is simple in circuit configuration and can perform a highly precise exposure control.

To achieve the above object, in the present invention, the rotation speed of the stepping motor is changed between two stages. That is, the stepping motor is rotated at a first speed corresponding to the exposure value during a first stage between the initial position of the shutter sectors and their position when an exposure begins, and after this first stage, the stepping motor is rotated at a second speed not associated with the exposure value.

According to a preferred embodiment of the present invention, the period of the drive pulses, which are applied to the stepping motor for opening the shutter sectors, is made variable in correspondence with a calculated exposure value. Therefore, the speed of opening the shutter sectors can be made high or low, correspondingly increasing or decreasing the amount of overrun or overshoot of the shutter sectors. In this case, after the exposure aperture starts being opened, drive pulses having a constant normal period are supplied to the stepping motor so as not to disturb the predetermined program-controlled exposure.

Specifically, the shutter sectors are moved more slowly from their initial position to the position they occupy when exposure begins, and more rapidly thereafter.

According to the exposure control apparatus of this invention, the drive speed of the stepping motor for opening and closing the shutter sectors is changed, thereby to control the amount of overshoot caused by mechanical inertia. In this way, an exposure error due to the overshoot of the shutter sectors, which could not be avoided heretofore, can now be eliminated. Furthermore, in the present invention, the overshoot amount of the shutter sectors caused by inertia is controlled, and an exposure control is effected in units of lower height than the unit step angle of the stepping motor. Thus, it is possible to effect a high precision control by positively using this overshoot. In addition, the number of drive pulses for driving the sectors and the drive speed of the stepping motor can be determined unambiguously. Therefore, the circuit configuration can be simplified using, for example, a ROM.

BRIEF DESCRIPTION OF THE DRAWINGS

FIG. 6 is a timing chart for explaining the generation of drive pulses having a period $T_L$; and FIG. 7 is a timing chart for explaining the generation of drive pulses having a period $T_O$.

DETAILED DESCRIPTION OF THE PREFERRED EMBODIMENTS

Figure 1:
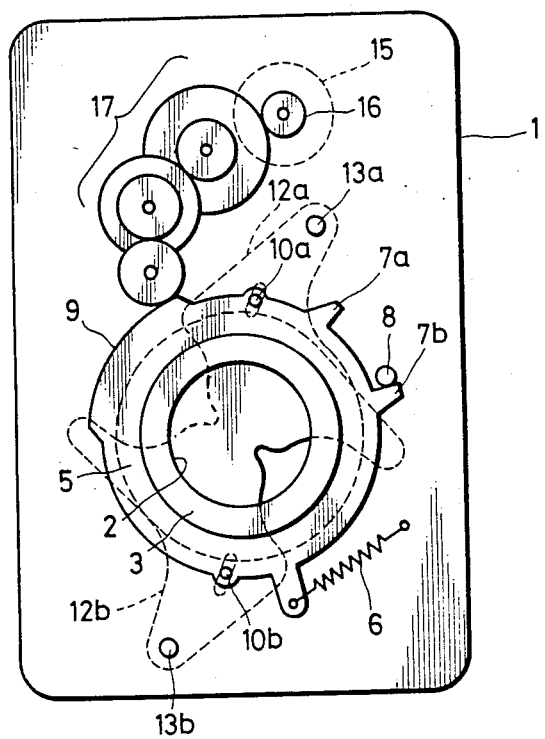
FIG. 1 is a diagrammatic view showing the construction of the program-controlled shutter used with this invention.

Referring now to FIG. 1, which shows the construction of a shutter used with the present invention, a shutter base plate 1 is formed with an exposure aperture 2 about which a collar 3 is fixedly mounted. A driving ring 5 is rotatably mounted on the periphery of the collar 3. The driving ring 5 is urged counterclockwise by a spring 6, which thus holds it in place in an initial position. The range of rotation is delimited by radial projections 7a and 7b cooperating with a stop pin 8 mounted on the shutter base plate 1. A gear 9 is integrally formed on a peripheral portion of the driving ring 5, and two shutter sector driving pins 10a and 10b are mounted on the driving ring 5.

On the back of the shutter base plate 1, shutter sectors 12a and 12b are rotatably mounted on pins 13a and 13b, respectively. The sector drive pins 10a and 10b pass through the shutter base plate 1 and are engaged in slots formed in the sectors 12a and 12b, respectively. To simplify the drawing, the holes in base plat 1 through which the sector driving pins 10a and 10b pass, are not shown. A stepping motor 15 is mounted on the back of the shutter base plate 1. The driving ring 5 is driven by the stepping motor 15 via a motor gear 16, a gear train 17 and the gear 9.

Figure 2:
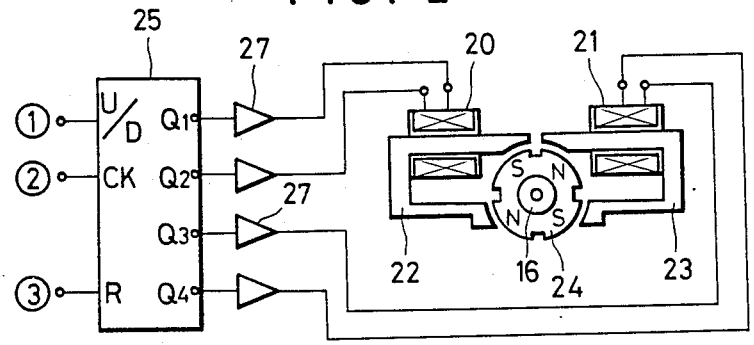
FIG. 2 is a diagrammatic view showing the construction and explaining the operation of a stepping motor.

The stepping motor 15 has a basic construction as shown in FIG. 2, which includes coils 20, 21, stators 22, 23, and a magnet rotor 24 with N and S poles disposed alternately. Driving current pulses shifting in phase by $\frac{1}{4}$ period are supplied to coils 20 and 21 via Q1 and Q4 terminals of a ring counter 25 and corresponding amplifiers 27. If the U/D terminal of the ring counter is at high level, pulses shifting in phase by $\frac{1}{4}$ period are shifted from the Q1 terminal to the Q4 terminal every time drive pulses are supplied to a CK terminal. In such a case, the magnet rotor 24 is driven in a forward direction. Contrarily, if the U/D terminal is at low level and drive pulse are supplied to the CK terminal, the shift direction of pulses outputted from the Q1 and Q4 terminals is reversed. In such a case, the magnet rotor 24 is driven in a reverse direction. Thus, the shutter sectors 12a and 12b are opened and closed by adjusting the rotary angle of the motor gear 16 based on the number of drive pulses supplied to the ring counter 25 and by changing the rotation direction of the motor gear 16 based on the input from the U/D terminal.

Figure 3:
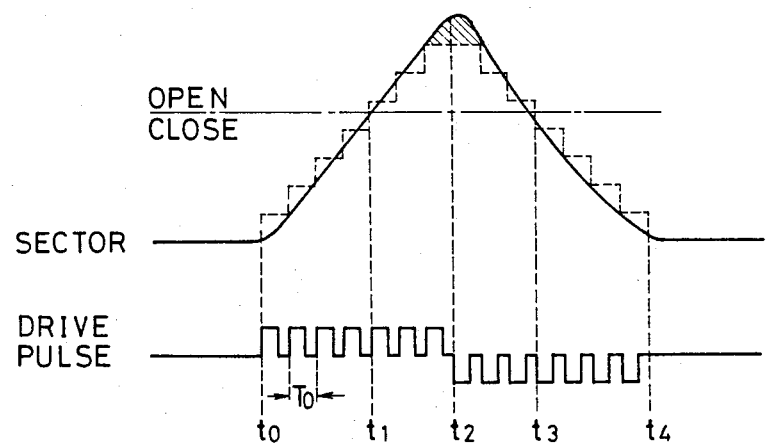
FIG. 3 is a timing chart wherein the shutter sectors are driven by drive pulses having only a period $T_O$.

The shutter sectors 12a and 12b are driven by the drive pulses supplied to the CK terminal of the ring counter 25, for example, according to the time sequence shown in FIG. 3. Specifically, at time t0, drive pulses are supplied to rotate the sectors 12a and 12b. In this initial state, the exposure is not effected since the sectors 12a and 12b partly overlap. At time t1 when a fifth drive pulse is supplied, a pinhole is formed by the sectors 12a and 12b to start an exposure. The number of drive pulses supplied during time t0 to t1 is a constant value determined based on the size and shape of the shutter sectors, and on other factors, for example, the characteristics of the stepping motor.

Let it be assumed that the open position of the sectors 12a and 12b, by which a proper exposure can be obtained, corresponds to seven drive pules, this figure being obtained by calculation of object brightness, film sensitivity, and the use of other information. The U/D terminal of the ring counter 25 becomes low level after seven drive pulses have been supplied starting from time t0. Then the stepping motor 15 is rotated in a reverse direction by drive pulses supplied after time t1, and correspondingly the sectors 12a and 12b are moved to close them. At time t3, the pinhole is closed and the actual exposure is terminated. Then the sectors 12a and 12b resume their initial position after four more drive pulses are supplied. The drive pulses for rotating the stepping motor 15 in a reverse direction are shown with their polarity inverted.

If the shutter sectors 12a and 12b are driven by the stepping motor 15 in ideal cooperation therewith, the motion of the sectors 12a and 12b is stepwise as shown by a broken line in FIG. 3. However, in reality, the motion is as shown by a solid line because of the influence of the mechanical inertia or the like. Even if the stepping motor 15 is rotated in a reverse direction at time t2, the operation of the sectors 12a and 12b is accompanied by an overshoot (hatched portion), thus resulting in an over exposure. The ratio of an overshoot to the whole exposure amount increases if the time between t0 and t1 is short, or in case of a high object brightness. This overshoot in such a case cannot be neglected. Taking into consideration the fact that the overshoot amount becomes constant if the drive speed of the stepping motor 15 is constant, a large part of the exposure error as above can be eliminated by calculating the number of drive pulses supplied to the stepping motor 15 until time t2.

Figure 4:
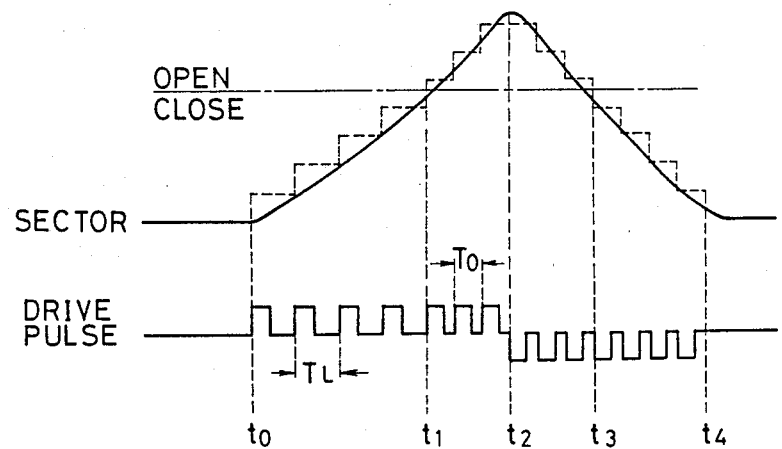
FIG. 4 is a timing chart wherein the shutter sectors are driven, before the exposure aperture starts being opened, by drive pulses having a period $T_L$.

In the above manner, an error can be eliminated in the case in which the shutter sectors 12a and 12b are moved in units of step angle of the stepping motor 15. According to the present invention, the opening and closing of the sectors 12a and 12b are controlled as shown in FIG. 4 to perform a highly precise exposure control in units of lower height than the step angle of the stepping motor 15. Specifically, taking into consideration the fact that the overshoot varies with the drive speed of the stepping motor, the drive speed of the stepping motor 15 is adapted to change during time t0 to t1, i.e., before the exposure aperture starts being opened.

Instead of driving the stepping motor 15 with the drive pulses shown in FIG. 3, drive pulses having a long period such as shown in FIG. 4 are used. With such drive pulses, the drive speed of the stepping motor 15 before the exposure aperture starts being opened is reduced, thereby to reduce the influence of the inertia and to reduce the overshoot amount as compared with the case of FIG. 3. For instance, assuming the exposure amount including the overshoot in FIG. 3 is EV15, it is reduced to EV14.5 using the same number of drive pulses but a longer period $T_L$ in FIG. 4 than the period $T_O$. After the start of actual exposure at time t1, the normal drive pulses of the period $T_O$ are supplied to drive the stepping motor 15. In the case in which the number of drive pulses between time t1 and time t2 is large, i.e., in case a longer exposure time is used, the overshoot amount does not decrease to a large extent. However, in such a case, a highly precise exposure control is not needed. Contrary to the above, it is also possible to increase the overshoot amount by using drive pulses having a shorter period.

Figure 5:
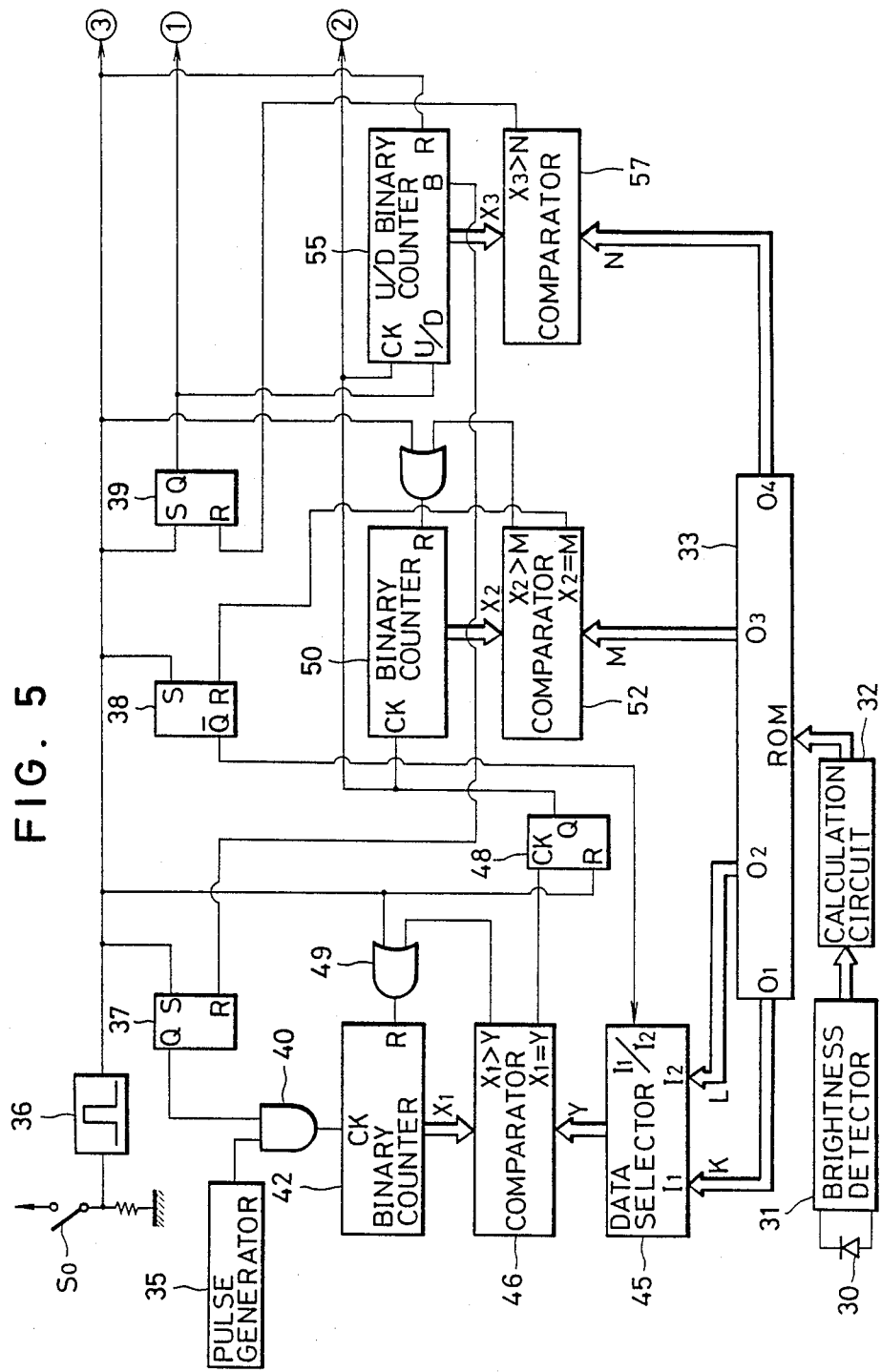
FIG. 5 is a circuit block diagram of an embodiment of the present invention.

The configuration of a circuit performing the above-described exposure control is shown in FIG. 5. In that figure, the object brightness measured by a light receiving element 30 is subjected to a process such as a logarithmic compression by a brightness detector 31, and inputted to a calculation circuit 32 in the form of an analog signal. Based on the inputted analog signal, the calculation circuit 32 performs a calculation for adding other exposure-determining factors such as film sensitivity information. The calculated result is outputted to a ROM 33 in the form of a digital signal.

The ROM 33 has four output terminals 01 to 04. A constant digital value K, which corresponds to the number of clock pulses generated by a pulse generator, is outputted from the output terminal 01. The digital value K is used for generating normal drive pulses having a period $T_0$ shown in FIG. 3. A digital value L, which also corresponds to the number of clock pulses, is outputted from the output terminal 02. The digital value L changes in accordance with an input value from the calculation circuit 32, and is used for changing the period of the drive pulses to $T_L$. If an overshoot amount control is not needed, a digital value equal to the digital value K is outputted.

A digital value M from the output terminal 03 corresponds to the number of drive pulses, for example four as shown in FIGS. 3 and 4, to be supplied to the stepping motor 15 during time t0 to t1, i.e., during the time from when the shutter sectors 12a and 12b in an initial position start moving to when the sectors actually begin to open the aperture 2. A digital value N outputted from the output terminal 04 corresponds to an exposure value inputted from the calculation circuit 32, and corresponds to the number of drive pulses, during time t0 to t2 of FIGS. 3 and 4, necessary for rotating the sectors 12a and 12b from the initial position to the proper open position.

Upon operating a release button, a release switch S0 is turned ON to output a pulse from a one-shot multivibrator 36. Then, a counter unit and a ring counter 25 to be described later is reset to an initial state, and flip-flop circuits (hereinafter abbreviated as FF circuit) 37, 38 and 39 are set to make the Q terminals thereof at high level (hereinafter abbreviated as H level). As a result, clock pulses from the pulse generator 35 are counted via an AND gate 40 at a binary counter 42.

The digital values K and L from the ROM 33 are inputted respectively to input terminals I1 and I2 of a data selector 45. When a switch terminal (I1/I2) is at low level (hereinafter abbreviated as L level), the digital value L from the input terminal I2 is supplied to a comparator 46 as a digital output Y. The comparator 46 compares a count X1 from the binary counter 42 with the digital output Y. If they are coincident, the CK terminal of FF 48 is made to be H level. If the count X1 exceeds the digital output Y, the count of the binary counter 42 is reset to "0" via an OR gate 49.

FF 48 changes the output state of its Q terminal at the leading edge of each pulse supplied to its CK terminal. Therefore, if the digital value L determined in correspondence with the exposure value is "5", drive pulses having a period $T_L$ shown in FIG. 6 are outputted. The drive pulses having a period $T_L$ drive the stepping motor 15 in a forward direction at a lower speed than do the drive pulses having a normal period $T_O$, thereby effecting the initial portion of the movement of the shutter sectors 12a and 12b at a low speed as shown in FIG. 4.

In parallel to the above operation, a binary counter 50 counts the number of drive pulses. When the count X2 becomes equal to the digital value M inputted from ROM 33 and corresponding to the exposure value, FF 38 is reset by an output from the comparator 52. Then, the $\overline{Q}$ terminal of FF 38 becomes H level so that the data selector 45 supplies the digital value K from the input terminal I1 to the comparator 46. Since the digital value K is set to a constant value, for example, "2", the period of drive pulses outputted from the Q terminal of FF 48 is changed from $T_L$ to $T_O$, as shown in FIG. 7. Therefore, after the sectors start the actual exposure, the stepping motor 15 is driven by the normal drive pulses having a constant period $T_O$.

The number of drive pulses supplied to the stepping motor 15 is counted by an up/down type binary counter 55. When the count X3 of the binary counter 55 exceeds the digital value N, FF 39 is reset by an output from the comparator 57. As a result, the Q terminal of FF 39 becomes L level, and the U/D terminal of the ring counter 25 (FIG. 2) becomes L level. As a result, the stepping motor 15 is rotated thereafter in a reverse direction by drive pulses supplied from the CK terminal, and the shutter sectors 12a and 12b are rotated in a direction to close them. At this time, the U/D terminal of the binary counter 55 also becomes L level, and the count of the binary counter 55 is thereafter decremented by drive pulses supplied to the CK terminal.

As shown in FIG. 4, the number of drive pulses necessary for moving the shutter sectors 12a and 12b from the proper open position back to the initial position, during the time t2 to t4, is equal to the number of drive pulses during the time t0 to t2. Therefore, when the count of the binary counter 55 becomes "0", the sectors 12a and 12b reach the initial position. At this time, its B (Borrow) terminal becomes H level whereby FF 37 is reset and the AND gate 40 is closed, to complete an exposure operation.

If a proper exposure control can be effected in terms of step angle, the digital value L outputted from ROM 33 is made equal to the digital value K to control the opening and closing of the shutter sectors 12a and 12b using only the drive pulses having a normal period $T_O$, as shown in FIG. 3. Furthermore, the amount of overshoot to be adjusted varies with the total exposure amount during time t1 to t3 even if the same ½ step exposure control is used. In this case, therefore, the digital value L is increased or decreased in correspondence with the output from the calculation circuit 32, thereby to change the period $T_L$ of the drive pulses. Furthermore, since the adjustment of the overshoot amount is particularly effective for a shorter exposure time, the above changes may be effected only for the case having a larger EV value than a predetermined value. Obviously, to change the drive speed of the stepping motor, intervals of drive pulses may be changed by adjusting the duty ratio and maintaining the pulse width constant.

The invention has been described with particular reference to the preferred illustrative embodiment thereof, but it will be understood that variations and modifications can be effected within the spirit and scope of the invention.

What is claimed is:

1. In an exposure control apparatus having shutter sectors for opening and closing an exposure aperture of a camera, and a stepping motor for driving the shutter sectors, said shutter sectors being opened when said stepping motor rotates in a forward direction and being closed when said stepping motor rotates in a reverse direction, said shutter sectors moving relative to each other during a first stage which terminates when an exposure aperture first appears between them; the improvement comprising:
   means for calculating an exposure value in accordance with object brightness; and
   means for controlling the rotation speed of said stepping motor such that said stepping motor is rotated in a forward direction at a first speed that varies inversely as said object brightness during said first stage, and after said first stage said stepping motor is rotated at a higher constant second speed not associated with said exposure value.

2. An exposure control apparatus according to claim 1, wherein said variation of said first speed is regularly progressive.

3. An exposure control apparatus according to claim 1, wherein the maximum value of said first speed is less than said second speed.

4. An exposure control device according to claim 1, in which the stepping motor rotates at a speed other than said second speed only when said object brightness is above a predetermined minimum.

5. In an exposure control apparatus having shutter sectors for opening and closing an exposure aperture of a camera, and a stepping motor for driving the shutter sectors, said shutter sectors being opened when said stepping motor rotates in a forward direction and being closed when said stepping motor rotates in a reverse direction; the improvement comprising:

means for controlling the rotation speed of said stepping motor such that during a first stage of the rotation of the stepping motor in a forward direction, up to the time an exposure aperture first begins to form between said shutter sectors, the stepping motor rotates slower than during rotation of the stepping motor thereafter and at a speed that varies inversely as the brightness of an object to be photographed.

6. An exposure control apparatus according to claim 5, wherein said variation of said first speed is regularly progressive.

7. A exposure control apparatus according to claim 5, in which during said first stage the rotation of the stepping motor is slower only when said object brightness is above a predetermined minimum.

8. An exposure control apparatus according to claim 5, wherein said stepping motor rotates slower from an initial position of said shutter sectors until said shutter sectors begin to open said exposure aperture.

9. An exposure control apparatus according to claim 5, comprising means to supply to said stepping motor drive pulses of longer duration during said slower rotation than during said reverse rotation.

10. In an exposure control apparatus having shutter sectors for opening and closing an exposure aperture of a camera, and a stepping motor for driving the shutter sectors, said shutter sectors being opened when said stepping motor rotates in a forward direction and being closed when said stepping motor rotates in a reverse direction, said shutter sectors moving relative to each other during a first stage which terminates when an exposure aperture first appears between them; the improvement comprising:

means for calculating an exposure value in accordance with object brightness; and
means for controlling the rotation speed of said stepping motor such that said stepping motor is rotated in a forward direction at a first speed during said first stage, and after said first stage said stepping motor is rotated at a higher constant second speed not associated with said exposure value, said control means comprising:

data generating means for generating a first datum associated with said exposure value and a second datum not associated with said exposure value;
a data selector which ordinarily picks up said first datum and when a select signal is inputted thereto, picks up said second datum;
a pulse generator for generating clock pulses having a predetermined period;
a first counter for counting said clock pulses when a release signal is generated;
a comparator for generating drive pulses for driving said stepping motor when the count of said first counter and the datum selected by said data selector become coincident with each other;
means for counting said drive pulses and for generating said select signal when said count reaches the first pulse number required for moving said shutter sectors during said first stage;
means for generating the pulse number corresponding to said exposure value; and
rotation direction control means for counting said drive pulses and switching the rotation direction of said stepping motor from forward rotation to reverse rotation when said count exceeds the pulse number corresponding to said exposure value.

11. An exposure control apparatus according to claim 10, wherein said select signal generating means comprises:

a second counter for counting said drive pulses;
a comparator for comparing the count of said second counter with said first pulse number;
and a first flip-flop for outputting said select signal when an output from said comparator is inputted thereto.

12. An exposure control apparatus according to claim 11, wherein said rotation direction control means comprises:

an up/down counter for counting up said drive pulses while said stepping motor is rotated in the forward direction, and counting down said drive pulses when said stepping motor is rotated in the reverse direction;
a comparator for comparing the count of said up/down counter with the pulse number corresponding to said exposure value and generating a signal when the latter exceeds the former; and
a second flip-flop for outputting a signal for rotating said stepping motor in a reverse direction when said second flip-flop is reset by the signal form said comparator, and outputting a signal for rotating said stepping motor in a forward direction when said second flip-flop is set by said release signal.

* * * * *